United States Patent Office 3,265,517
Patented August 9, 1966

3,265,517
HYDRODECHLORINATION PROCESSES AND PRODUCTS OF CHLORINATED ASPHALTENES AND THERMOPLASTIC HYDROCARBON RESINS
James B. Clelland, Newtown Square, Pa., Seymour W. Ferris, Mount Holly, N.J., and Ernest P. Black, West Chester, Pa., assignors to Sun Oil Company, Philadelphia, Pa., a corporation of New Jersey
No Drawing. Filed Mar. 1, 1962, Ser. No. 176,809
8 Claims. (Cl. 106—270)

This application is a continuation-in-part of our application Serial Number 161,375, filed December 22, 1961.

This invention relates to new compositions and to a process of making them. More particularly it relates to compositions comprising chlorinated asphaltenes chemically joined with various modifying materials including hydrocarbon oils, waxes, elastomers and thermoplastic resins.

In our copending application serial number 161,375, filed December 22, 1961, we have disclosed a composition comprising cross-linked asphaltenes and a method of making the composition.

As stated in our parent application, asphalts are colloidal systems having a disperse phase and a continuous phase. The disperse phase, i.e. the micelles, comprises the components of highest molecular weight—known to the art as asphaltenes. They are solids. The continuous, or intermicellar phase, represents the components of lower molecular weight; and these are known as maltenes. They are non-solids. The maltenes are further divided for purposes of classification into a resin fraction and an oil fraction.

Asphaltenes are organic materials and are defined by their solubility characteristics in certain arbitrarily selected solvents. The asphaltenes are insoluble in low-boiling saturated hydrocarbons such as petroleum naphtha, pentane and hexane, but are soluble in carbon tetrachloride and carbon disulfide. These solubility characteristics are the basis of the separation of asphaltenes as a distinct phase. They are usually separated from the solvent in the form of a coarse brown-black powder having essentially no co-hesiveness. The yield and properties of an asphaltene depend upon the asphalt source, the kind and amount of solvent used for separation, and the separation conditions. Asphaltenes have a high carbon-to-hydrogen atomic ratio and contain varying amounts of oxygen, sulfur and nitrogen. A high carbon-to-hydrogen ratio indicates a strongly aromatic nature. For example, the value for saturated hydrocarbons is about 0.5; for benzene, about 1.0; and for naphthalene, about 1.25. The C:H ratio of asphaltenes derived from some typical sources is as follows:

| Origin: | C:H ratio of Asphaltenes (Naphtha Precipitation) |
|---|---|
| Residual bitumens | .85–.91 |
| Blown bitumens | .82–.88 |
| Highly cracked material | 1.25 |
| Trinidad asphalt | .79 |
| Gilsonite | .71 |

Asphaltenes are believed to have a molecular weight of from about 2,000 to about 10,000. The actual molecular configuration of asphaltenes is not known. Some observers suggest a configuration involving large fused rings and others suggest smaller fused rings joined by and bearing aliphatic chains (The Properties of Asphaltic Bitumen, Pfeiffer).

In our earlier application, we disclosed that asphaltenes are very reactive with chlorine and that when part of the chlorine is removed, the product exhibits properties indicating that the asphaltene molecules have been cross-linked. The melting point of the treated asphaltenes is raised at least 300° F. and the solubility in $CCl_4$ and $CS_2$ is greatly lowered.

Although crosslinked asphaltenes have high melting points and low solubilities, molding and coating properties are not entirely satisfactory because of brittleness, lack of compatibility and lack of cohesion.

The object of this invention is to provide compositions comprising asphaltenes chemically joined with modifying materials so that the products have a wide range of desirable properties depending on the type of modifying material employed.

Another object of this invention to improve the molding and coating properties of compositions containing crosslinked asphaltenes. Still another object of the invention is to provide molded compositions having good high temperature properties and high cross-sectional strength without being brittle. A further object is to provide asphaltene-containing molded and coating compositions which are flexible.

Other objects and advantages of the invention will be apparent from the following description which discloses certain non-limiting embodiments.

In one embodiment, the process of the invention comprises chlorinating the asphaltenes and dechlorinating in the presence of the modifying material. While this is the preferred embodiment, the modifying material can be intermixed with the completely treated (chlorinated and dechlorinated) asphaltenes if desired, although the resulting products are not necessarily equivalent. Another embodiment envisions chlorinating the modifying material and dechlorinating the mixture.

The source of the starting asphaltenes treated is not critical. Any bitumen, asphalt, or crude residuum containing asphaltenes is suitable. The two principal sources are native asphalts and asphalts resulting from petroleum refining operations. Asphalt from petroleum refining operations like deasphalting of crude oils will usually require further solvent treatment to separate or further concentrate the asphaltenes. Air blown and other chemically treated asphalts can be used. It is not necessary that the asphaltene concentration of the starting material be 100 percent. However, a concentration of at least 50 wt. percent asphaltenes in the asphaltene concentrate is required to obtain products within the desired properties. The preferred concentration of asphaltenes is 75 to 100 percent by weight. Solvents such as petroleum naphtha, pentane, hexane, cyclohexane, and diethylether can be used to concentrate the asphaltenes. The asphaltene starting material will have a carbon-to-hydrogen atomic ratio of from about 0.70 to about 1.00 and will contain 0–5 wt. percent each of sulfur, nitrogen and oxygen. Metals such as vanadium, nickel and iron may be present in small amounts usually 1 to 2000 parts per million. For treatment, the asphaltenes can be ground to a fine powder and contacted in the dry state, or they may be dispersed in a solvent such as $CCl_4$.

The softening point of the original asphaltene material can be from about 300 to about 500° F., and it is 95–99 percent soluble in $CS_2$. These properties depend on the conditions of the method of concentration, e.g. solvent, severity, number of stages.

The subject reaction involves chemical joining as evidenced by the evolution of HCl, the lowered chlorine content, the solvent behavior and the melt point of the resultant products.

The reaction according to the invention therefore involves chemically joining or coupling an asphaltene molecule and a molecule of the modifying material. A plurality of asphaltene molecules and/or of modifying material molecules enter into the condensation reaction in at least some cases. Crosslinking of asphaltene molecules with the modifying material molecules takes place to at least some extent.

Any organic compound which contains hydrogen atoms which can be removed to form linking sites can be coupled with the chlorinated asphaltenes; these include hydrocarbons and organic compounds which contain functional groups such as: halogens, hydroxyl, $-NO_2$,

—COOH $-SO_2OH$, $-COOR$, $-CN$, $-NH_2$, $-NHR$, etc. Specific examples include halogenated waxes and oils, fatty acids containing 10–30 carbon atoms and salts thereof, amines, amides and esters.

It is believed that some or all of the following reactions take place during heat dechlorination:

$$AH + Cl_2 \rightarrow ACl + HCl$$

$$ACl + AH \xrightarrow{\Delta} A-A + HCl$$

$$ACl + HR \xrightarrow{\Delta} A-R + HCl$$

where:

AH represents the asphaltene molecule.
ACl represents the chlorinated asphaltene molecule.
HR represents an organic radical containing an available hydrogen atom.
AA represents joined asphaltene molecules.
AR represents an asphaltene molecule joined with an organic radical.

From the above it can be seen that a very large number of organic materials can be used to modify asphaltenes. The essential feature is that the material contains sufficient available hydrogen to provide sites for attachment to the asphaltene molecules at the points where chlorine is removed during dechlorination. The amount of modification, e.g. crosslinking or coupling, depends in part upon the degree to which the asphaltenes have been chlorinated and on the conditions of dechlorination. The characteristics of the modified products depend on the size of the molecules and the molecular weight of the modifying material. Organic compounds having a molecular weight of at least 200 and containing at least 10 carbon atoms and 20 hydrogen atoms per molecule are preferred. These can have aliphatic, cycloaliphatic or aromatic structure.

Suitable resin ingredients for use as the modifying material in our composition are generally designated as organic synthetic polymers produced by polymerizing polymerizable organic monomers having ethylenic unsaturation i.e. monomers containing the $CH_2=C<$ grouping. The molecular weights of the polymers can vary from 1,000 to 500,000 or higher, depending on the properties desired in the final product. The resins are preferably thermoplastic. From 5 to 95 wt. percent resin can be used.

Examples of monomers containing the $CH_2=C<$ grouping are olefins containing from two to twelve carbon atoms e.g. ethylene, propylene, butene-1, isobutylene, pentene-1, 4-methyl-pentene-1, hexene-1, etc., vinylaryl compounds, e.g. styrene, halogenated styrenes, vinylnaphthalene, vinylcyclohexene, allylbenzene, etc., unsaturated amides such as acrylamide and substituted acrylamides; butadienes, e.g. 1,3-butadiene, 2-chlorobutadiene; saturated and unsaturated alcohol esters of aliphatic and aromatic, monobasic and polybasic acids such as acrylic, oxalic, adipic, benzoic, phthalic and terephthalic acids; suitable alcohol components including methyl, ethyl, propyl, isopropyl, butyl and amyl alcohol.

Other examples of suitable polymers include polymers of the vinyl halides, particularly vinyl chlorides and the various vinylidene halides e.g. vinylidene chloride. These may be used as copolymers, e.g. copolymers of vinyl chloride and vinyl acetate and copolymers of vinyl acetate and ethylene.

Polymers particularly suitable and preferred for use in the compositions of the invention are those produced by polymerizing olefins having the general formula

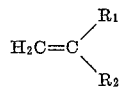

in which $R_1$ is a hydrocarbon radical and $R_2$ is hydrogen or a hydrocarbon radical. The hydrocarbon radicals can be alkyl, aryl, or alicyclic. Specific examples include polyethylene made by the so-called high pressure process or the so-called low pressure process and isotactic, atactic and syndiotactic polypropylene.

Isotactic polypropylene is a thermoplastic resin. Several modes of preparation are set forth in the recent text "Polypropylene" by T. O. Dresser, Reinhold Publishing Co., 1960. It has a melting point ranging from 300–350° F., and a molecular weight ranging from 50,000 to 200,000 or more. Commercial polymers are highly crystalline. The particular isotactic polypropylene in the blends of Table I, had a melting point of 320° F. From 1 to 95 wt. percent polymer can be blended with the asphaltenes, with a range of 20 to 80 wt. percent polymer being preferred.

Atactic polypropylene is an amorphous hydrocarbon material which has random chain formation and a resulting disordered internal structure when compared with isotactic, or spatially ordered polypropylene. It is a translucent solid, produced as a by-product in the making of isotactic polypropylene. Its typical physical properties are: specific gravity—0.86, molecular wt.—10,000–30,000, melting point—250–350° F., pentane solubility—80% plus, and brittle point—21° F. The particular atactic polypropylene in the blends of Table I had a melting point of 300° F. From 1 to 95 wt. percent polymer can be blended with the asphaltenes, with a range of 20–80 wt. percent polymer being preferred.

A number of different hydrocarbon oils can be used in conjunction with asphaltenes. The oils may be light or heavy. A particularly suitable group of oils are those having molecular weights ranging from 100 to 700, preferably 200–500, a refractive index ranging from 1.45 to 1.60 and a VGC (viscosity-gravity constant) ranging from .79 to 1.05 (see Hill et al., Industrial and Engineering Chemistry, volume 20, 641 (1928). The oils can be naphthenic, paraffinic or aromatic in character. By the term "naphthenic" we mean oils containing substantial amounts of carbon atoms in naphthenic rings—$C_N$ (this method of classifying oils is described in Analytical Chemistry, volume 30, 1224 (1958), and Industrial and Engineering Chemistry, volume 48, 2232 (1956), i.e., 30 to 45 percent and a viscosity-gravity constant ranging from .85 to .90. By the term "paraffinic" we mean oils containing substantial amounts of carbon atoms in paraffin chains—$C_p$, i.e. 50 to 70% and a viscosity-gravity constant ranging from .79 to .84. By the term "aromatic" we mean oils containing substantial amounts of carbon atoms in aromatic rings—$C_a$, i.e., 30 to 60 percent and a viscosity-gravity constant ranging from .91 to 1.05. Generally, the oils will have a viscosity ranging from 30 to 160 SUS at 210° F. Mixtures of the above oils can be used. From 5 to 80 wt. percent, preferably 5 to 40 wt. percent oil can be blended with asphaltenes. The particular oil used in the blends of Table C is a naphthenic distillate lubricating oil having an API gravity of 18 and a viscosity of 135 SUS at 210° F.

Natural waxes and synthetic waxes are suitable wax components for the asphaltene compositions of this invention. Paraffin waxes and microcrystalline waxes produced in petroleum refining operations are preferred. These have melting points ranging from 100 to 200° F. It is not necessary that the waxes be oil free. Chemically treated waxes such as oxidized and chlorinated waxes can also be used. The particular wax in the blends of Table I has a melting point of 123° F. From 5 to 80 wt. percent, preferably 5 to 40 wt. percent wax can be blended with the asphaltenes.

Natural and synthetic elastomers can be employed to modify the asphaltene compositions of our invention. Specific examples include natural rubber or latex, neoprenes, nitrile rubbers, butadiene-styrene rubbers (SBR), ethylene-propylene copolymer rubbers, butyl rubbers, Thiokols, polybutadienes, polyisoprenes, polyurethanes, silicone rubbers and fluoro rubbers.

In carrying out the invention the chlorination and dechlorination steps of the process may be accomplished using conventional equipment. The asphaltene starting material may be obtained by means known in the art, usually multistep solvent precipitation. The asphaltene is placed in any suitable closed reactor and contacted with a chlorinating agent such as chlorine gas. Following addition of the modifying material, dechlorination can be accomplished by heating, preferably in an inert atmosphere, or by chemical means. Suitable temperatures, times and the degree of chlorination and dechlorination may be ascertained by those skilled in the art. Alternatively chlorination and dechlorination may be conducted in the presence of a suitable solvent.

The chlorination is usually conducted at temperatures ranging from 10 to 150° F. Pressures ranging from subatmospheric to 100 p.s.i. or more can be used. The time of treatment is in the order of between 5 minutes to 48 hours. Ordinarily times of 15 to 90 minutes at treating temperatures ranging from 50 to 100° F. are preferred. The asphaltenes may be agitated during chlorination by feeding the chlorine through a sparger, rotating the reactor, using a motor-driven stirrer, or by other applicable means. The chlorine is usually supplied as chlorine gas although chlorine in other forms can be used. From 5 to 40 weight percent chlorine can be added based on the starting material.

The chlorinated asphalteness and modifying material are thoroughly mixed in any suitable manner prior to dechlorination. Dechlorination can be accomplished by heating in an inert atmosphere such as nitrogen or in air. When the chlorination has been done in the presence of a solvent, dechlorination can be carried out with sodium or potassium with or without added heat. Dechlorination is accomplished by heating at temperatures at least 100° F. higher than the chlorination temperature, preferably at a temperature ranging from 250 to 700° F. The chlorine content of the final product is preferably from 1 to 15 weight percent, but higher or lower chlorine contents can be used.

The following examples show various non-limiting embodiments of the invention:

Example I

Asphalteness were prepared from a vacuum reduced petroleum residuum asphalt having the following properties:

| | |
|---|---|
| Viscosity-Saybolt furol at 210° F. | 1191 |
| Specific gravity at 77° F. | 1.019 |
| Softening point, ° F. | 111 |
| Penetration (ASTM-D-5-25): | |
| at 32° F. | 25 |
| at 39.2° F. | 33 |
| at 77° F. | 103 |
| Flash (open cup), ° F. | 655 |
| Solubility in 86° naphtha (AASHO T-4635)[1] | 78.3 |
| Naphtha asphalteness, percent | 21.7 |

[1] For the purpose of these examples, solubility in naphtha will be considered the measure of asphaltenes, i.e., the portion which is insoluble in the solvent is asphaltenes.

6.85 gal. (35#) of the above asphalt were heated to about 180° F. and extracted with 30.3 gal. of 86° naphtha. The solution was allowed to settle, and the solvent layer was drawn off. The raffinate was extracted again with 34.3 gal. of solvent. After settling, the solvent layer was drawn off. The wet product was air-dried, then heated in a steam bath, and dried. The dry asphaltene yield was 6066 grams.

Two additional portions of the above asphalt were extracted in the same manner. The total dry asphaltenes amounting to 15,189 grams were ground and sieved to a fine powder. Ninety-six percent of the powder passed through an 8-mesh sieve. The asphaltenes were 13.1 percent soluble in naphtha, 99.8 percent soluble in carbon disulfide, and 98.7 percent soluble in carbon tetrachloride. Thus the naphtha asphaltenes were 86.9%. This material was used for the examples which follow.

Example II 504 grams of the asphalteness of Example I were placed in an 11-inch-diameter glass dish having a glass cover. Closure between top and bottom is by means of ground glass flanges. The cover had openings for admission of chlorine and removal of evolved gases. Chlorine was passed from a cylinder through tubing and the dish at a rate of 250–600 cc./min. for 20.5 hours at 80° F. Nitrogen was then passed through the dish to remove unreacted chlorine. The net weight gain of the chlorinated asphaltenes was 178 grams.

Runs 1–7 of Table A show the effect of time on the quantity of chlorine reacted. Runs 8 and 9 show the effect of dissolving the asphaltenes in carbon tetrachloride and bubbling chlorine through the solution.

Chlorination has no appreciable effect on the melting point and naphtha solubility of asphalts or of asphaltenes. Dechlorination, however, results in dramatic changes in the properties of the asphaltenes.

TABLE A.—CHLORINATED ASPHALTENES

| Run No. | Asphaltenes, Gms. | CCl₄ (cc.) | Temp. (° F.) | Time (hrs.) | Cl Weight percent | C/H | CS₂ Sol. percent [a] | CCl₄ Sol. percent [b] | Naphtha Sol. percent [c] |
|---|---|---|---|---|---|---|---|---|---|
| | Untreated Asphaltenes | | | | | 0.85 | 99.8 | 98.7 | 13.1 |
| 1 | 504 | | 80 | 20.5 | 27.1 | 0.91 | 99.7 | 99.0 | 19.0 |
| 2 | 500 | | 80 | 5.5 | 16.1 | 0.90 | | | |
| 3 | 500 | | 80 | 4.17 | 17.75 | 0.94 | 99.3 | 98.7 | 21.9 |
| 4 | 500 | | 80 | 0.38 | 4.72 | 0.84 | | | |
| 5 | 500 | | 80 | 41.0 | 30.0 | | | | |
| 6 | 1,000 | | 80 | 1.0 | 2.96 | | | | |
| 7 | 60 | 350 | 80–115 | 2.0 | 34.1 | 1.08 | | | |
| 8 | 100 | 600 | 80–130 | 0.22 | 12.9 | 0.96 | | | |
| 9 | 50 | 320 | 80 | 2.0 | 41.0 | 1.07 | | | |

[a] Solubility obtained following ASTM D4–52.
[b] Solubility obtained following ASTM D165–42.
[c] Solubility obtained following AASHO T-4635.

Example III 500 grams of the chlorinated asphalt of Example II, containing 27.1 weight percent chlorine, were placed in an 11-inch-diameter covered glass dish. The dish was placed in a constant-temperature oven, and nitrogen was passed through the dish. The oven was maintained at 400° F. for 3½ hours. At the end of this time the weight loss was 71 grams, and the chlorine content was 13.25 percent. The properties of this product are shown in Run 1 of Table B.

200 grams of the above product were further dechlorinated in the same dish and oven at 500° F. for a further period of 3½ hours. The properties of this product are shown in Run 2 of Table B.

Runs 3–5 show the results of dechlorination on asphaltenes chlorinated to 16.1, 4.72 and 2.96 weight percent.

Runs 6–8 show the results of dechlorination in the presence of air and oxygen.

Runs 9 and 10 show the results of dechlorination in the presence of a sodium dispersion.

Run 11 shows the results of treating asphaltenes derived from Gilsonite—a native bitumen. 50 grams of Gilsonite asphaltenes were chlorinated at 80° F. in powder form for 30 minutes to a chlorine content of 21.8%. The intermediate product was dechlorinated at an oven temperature of 550° F. for 1.0 hour to a chlorine content of 4.37%.

thoroughly mixed in a crystallizing dish. The dish was placed in the covered glass dish and the assembly was placed in a constant temperature oven. The oven was heated to 550° F. and this temperature was maintained for one hour in a nitrogen atmosphere. The product was a brittle cake weighing 86.8 grams. The properties of this product are shown in Run 2 of Table C. To obtain modulus of rupture a portion of the cake was ground and molded in a Carver press at 250° F. and 5000 p.s.i. The foregoing produced a 1 x 4 x ⅛ inch test blank. The modulus of rupture was obtained by placing the test blank over two bars spaced two inches apart and exerting pressure on the middle cross section until the blank broke. The formula:

$$MR = 3PL/2BT^2$$

in which:

$P$ = load in pounds
$L$ = blank length—inches
$B$ = blank breadth—inches
$T$ = blank thickness—inches was used to obtain the numerical value for modulus of ing both isotactic and atactic polypropylene.

Runs 3, 4 and 5 show the effect of varying the proportions of chlorinated asphaltenes and atactic polypropyl-

TABLE B.—DECHLORINATED ASPHALTENES

| Run No. | Dechlorination Temp., °F. | Dechlorination Time, Hours | Chlorine Before | Weight Percent After | C/H Ratio | CS₂, Sol. Percent | CCl₄, Sol. Percent | Naphtha, Sol. Percent | M.P., °F.[a] | M.R.[b] | °F. Pen. 5 [c] | Mold Rating [d] |
|---|---|---|---|---|---|---|---|---|---|---|---|---|
|  |  |  | Untreated Asphaltenes | 13.25 | 0.85 | 99.8 | 98.7 | 13.1 | 333 | 186 | 170 | 8 |
| 1 | 400 | 3.5 | 27.1 | 0.97 | 0.97 | 24.1 | 13.9 | 4.0 | 900 |  |  | 5 |
| 2 | 400/500 | 3.5/3.5 | 27.1 | 9.52 | 1.01 | 29.2 | 17.8 | 0.7 | 900 | 305 | 495 | 4 |
| 3 | 550 | 1.0 | 16.1 | 1.95 | 1.07 | 49.5 | 60 | 6.1 | 1,000 | 192 | 440 | 6 |
| 4 | 550 | 1.0 | 4.72 | 1.36 | 0.90 | 74.3 | 59.1 | 15.5 | 750 | 224 |  | 8 |
| 5 | 550 | 1.0 | 2.96 | 1.32 |  | 84.0 | 75.0 | 23.7 | 600 | 357 |  | 8 |
| 6 [e] | 300 | 4.0 | 34.1 | 25.9 | 1.10 |  |  |  |  |  |  |  |
| 7 [e] | 400 | 2.0 | 34.1 | 5.9 | 2.21 |  |  |  |  |  |  |  |
| 8 [f] | 400 | 5.5 | 12.9 | 1.22 | 1.94 |  |  |  | 800 |  |  |  |
| 9 [g] | Sodium |  | 12.9 | 0.30 | 0.93 |  |  |  |  |  |  |  |
| 10 [g] | Sodium |  | 16.2 | 9.7 | 0.98 |  |  |  |  |  |  |  |
| 11 | 550 | 1.0 | 21.8 | 4.37 |  | 8.42 |  | 4.11 | 900 |  |  |  |

[a] Melting points over 300° F. were obtained by hot plate using "Tempilstiks" (Tempil Corp., 132 W. 22d St., N.Y.C.) in an atmosphere of nitrogen.
[b] Modulus of rupture, p.s.i.g. at 75° F.
[c] Temp. in degrees fahrenheit to which sample must be heated to obtain a penetration of 5.
[d] An arbitrary measurement in which 10 represents excellent compaction and 0 represents essentially no compaction.
[e] Dechlorinated in the presence of air.
[f] Dechlorinated in the presence of air and oxygen.
[g] Dechlorinated with sodium in xylene at 180–200° F. for 1 hour.

Table B shows that dechlorination results in a dramatic reduction in the solubility of asphaltenes in carbon disulfide, i.e., from 99.8 to values in the range of from 24.1 to 49.5. Since asphaltenes and chlorinated asphaltenes are almost completely soluble in the solvent, it is apparent that the molecular configuration of the asphaltenes has been radically altered by the dechlorination treatment. The same effect is observed when solubility is tested with carbon tetrachloride. These results indicate that the asphaltenes are polymerized and crosslinked by he chlorination-dechlorination process described above. Additional evidence of higher molecular weight is found by noting the increase in melting point e.g., from 333° F. to 600 to over 1,000° F. and by noting the increase in modulus of rupture and the temperature required to obtain a peentration of 5. These properties clearly differ from the properties of air blown (oxidized) asphalt which has a naphtha solubility of from 50–90% and a solubility in carbon disulfide of 95–100 (see Abraham, Asphalts and Allied Substances, vol. 2, 1961, page 175).

Example IV 90 grams of chlorinated asphaltenes (18% Cl and 10 grams of atactic polypropylene in 140 cc. of CCl₄ were ene. Run 10 shows the properties of a product containing both isotactic and atactic polypropylene.

Example V 67 grams of chlorinated asphaltenes (18% Cl) and 33 grams of isotactic propylene in 88 cc. of CCl₄ were mixed and heat dechlorinated in the manner shown in the previous example. The product was a brittle cake which molded well at 350° F. and 2500 p.s.i. The properties of this product are shown in Run 6 of Table C. Run 7 shows the effect of increasing the proportion of isotactic polypropylene.

Example VI 67 grams of chlorinated asphaltenes (18% Cl) and 33 grams of paraffin wax (M.P. 123° F.) in 87 cc. of CCl₄ were mixed and heat dechlorinated according to the procedure of Example IV. The properties of this product are shown in Run 8 of Table C.

Example VII 50 grams of chlorinated asphaltenes (18% Cl) and 25 grams of naphthenic distillate lube oil having an API gravity of 18 and a viscosity of 135 SUS at 210° F. were treated according to the procedure of Example IV. The product was a hard cake weighing 66.8 grams having the properties shown in Run 9.

TABLE C.—HEAT DECHLORINATION OF BLENDS OF CHLORINATED ASPHALTENES AND MODIFYING MATERIALS

| Run No. | Components, Weight Percent | Percent Cl in Product | Percent Cl Removed | HPMP, °F a | Solubility b | | | Crush Strength | M.R. | C/H Ratio |
|---|---|---|---|---|---|---|---|---|---|---|
| | | | | | Naphtha | CCl₄ | CS₂ | | | |
| 1 | 100% asphaltenes (16% Cl) | 1.9 | 14.2 | 1,000+ | 6.1 | | 49.5 | | 192 | 1.07 |
| 2 | 90% asphaltenes (18% Cl) / 10% atactic polypropylene | 4.1 | 13.2 | 950 | 4.1 | 6.4 | | | <76 | 0.88 |
| 3 | 80% asphaltenes (18% cl) / 20% atactic polypropylene | 3.9 | 12.8 | 950 | 13.4 | 28.4 | 37.3 | | 240 | 0.77 |
| 4 | 67% asphaltenes (18% Cl) / 33% atactic polypropylene | 2.5 | 14.0 | 850 | 26.9 | 25.9 | 31.7 | 700 | 225 | 0.72 |
| 5 | 33% asphaltenes (18% Cl) / 67% atactic polypropylene | 2.0 | 11.7 | 315 | 34.1 | 11.9 | 42.7 | 700 | 387 | 0.58 |
| 6 | 67% asphaltenes (18% Cl) / 33% isotactic polypropylene | 2.7 | 13.7 | 950 | 4.0 | 9.0 | 10.1 | 1,800 | 930 | 0.69 |
| 7 | 33% asphaltenes (18% Cl) / 67% isotactic polypropylene | 1.1 | 14.4 | 600 | 10.4 | 5.0 | 5.6 | | 1,006 | 0.59 |
| 8 | 67% asphaltenes (18% Cl) / 33% petroleum wax | 2.8 | 13.5 | 950 | 26.6 | | 45.0 | | | 0.71 |
| 9 | 67% asphaltenes (18% Cl) / 33% hydrocarbon oil | 2.6 | 12.2 | 1,000+ | 37.7 | | 51.7 | | | 0.78 |
| 10 | 67% asphaltenes (18% Cl) / 16.5% atactic polypropylene / 16.5% isotactic polypropylene | 3.1 | 13.1 | 1,000+ | 13.6 | 12.5 | 19.5 | | 155 | 0.71 | a Melting points over 300° F. were obtained by hot plate using "Tempilstiks."
b See foot of Table A for method of determining solubility. (See foot of Table B.)

Run 1 of Table C shows the properties of unmodified dechlorinated asphaltenes; 1.9% chlorine remains in the product, 14.2 having been removed. As previously stated, asphaltenes can be dechlorinated to lower or higher degrees and the dechlorination step can be controlled to remove a greater or lesser degree of chlorine to produce products having different degrees of chlorination thus to produce products having different degrees of crosslinking and differing properties as a result of this. This particular sample had a melt point of over 1000° F. and a modulus of rupture of 192; thus the product can be characterized as very hard and very brittle. The surface of the test piece was semi-abrasive.

Runs 2–5 show the effect of adding various amounts of atactic polypropylene e.g. 10%, 20%, 33% and 67% (by weight). Melting points decrease from 950 in the 10% sample to 315 in the 67% sample. The products of runs 2 and 3 had a semi-abrasive surface and were rather brittle. They were not nailable i.e., cracked when a nail was driven into the surface of a 1 x 4 x ¼ test blank. The products of runs 4 and 5 were nailable and were flexible. Both had some resilience and the surfaces were regular and smooth.

Runs 6 and 7 show the effect of isotactic polypropylene. The test pieces had a smooth surface and were rather stiff but slightly flexible. The sample containing 33% isotactic polypropylene had a melt point of 950° F. and a modulus of rupture of 930. The sample containing 67% isotactic polypropylene had a melt point of 600° F. and a modulus of rupture of 1006. Thus the use of isotactic polypropylene together with asphaltenes provides a molded article having a high melt point together with a relatively high modulus of rupture.

Run 8 shows the effect of adding 33% petroleum wax having a melt point of 123° F. It should be noted that the melt point of the sample remains high, i.e. 950° F. Run 9 shows the effect of adding 33% of a hydrocarbon oil. The melt point still remains high. Runs 8 and 9 demonstrate that materials having a very low degree of unsaturation can be used to modify asphaltenes.

Other unique compositions can be made by employing material such as butadiene-styrene elastomers, polyvinylchloride and copolymers of vinylchloride, polystyrene, nylon and petroleum resins.

*Example VIII*

As previously stated, asphalts consist of a disperse phase known as asphaltenes and a continuous phase known as maltenes. The maltenes consist of resins and oils and can be separated from asphaltenes by means of solvents such as naphtha. 67 gms. of maltenes from Lagomedio asphalt were dispersed in 80 cc. of CCl₄. 36 gms. of chlorinated asphaltenes containing 14% chlorine were blended with the maltenes. The mixture was heated for 1 hour in an oven under nitrogen in the manner previously described. 94.5 gms. of a tacky solid were recovered. This material was molded by heating at 150° F. for 10 minutes at atmospheric pressure followed by the application of 5000 p.s.i.g. for 2 minutes. The 1 x 4 x ⅛ inch test blank was very smooth and regular and slightly tacky. The outstanding characteristic was good flexibility. The melt point was 388° F. which is over 200° F. higher than the melt point of the original maltenes.

*Example IX*

The effect of chlorinated asphaltenes on elastomers was tested by dissolving 20 gm. of styrene-butadiene copolymer having a Mooney viscosity of 46–58 (Firestone-SBR-1500) in 80 cc. of benzene and mixing the gel with 80 grams of chlorinated asphaltenes containing 14% chlorine. The blending maintained at 450° F. for 1 hour under a nitrogen atmosphere in the oven previously described. A pasty mass of rubbery consistency weighing 91.8 gms. was recovered. Molds were made by heating at 300 to 450° F. for 10 to 20 minutes and then applying 4000 to 5000 p.s.i.g. for 1 to 5 minutes. The molds had the feel and consistency of hard rubber with moderate flex and some nerve. A nail could be driven through the 1 x 4 x ⅛ inch blank without splitting or cracking. The melt point was 900° F.+.

A similar run was made reversing the amounts of ingredients e.g. 80 gms. of SBR copolymer and 20 gms. of chlorinated asphaltenes. Molds were made at 1000 p.s.i. and 300–400° F. for 1 minute. The 1 x 4 x ⅛ blanks could be bent 180° and had an immediate complete return. Blanks of untreated SBR had a slow and incomplete return when they were bent 180°. The melt point was 900° F.+.

Asphaltenes chemically joined with elastomers are believed to be excellent components for wallboard. Fire retardents and fillers can be added if desired.

*Example X*

Runs with 20 wt. percent and 80 wt. percent polyvinylchloride ("GEON 101") with 80 wt. percent and 20 wt. percent respectively of chlorinated asphaltenes (14% chlorine) were made following the procedure set forth in the previous examples. The reaction products produced suitable molds which were rather brittle. The melt points of both samples were over 900° F.

The compositions prepared in accordance with the invention can be molded or extruded and can be used to form plates, sheets or a variety of molded objects which exhibit better properties than the treated asphaltenes alone. The compositions can be extended with suitable fillers including asbestos, sand, clays, paper, wood flour, sawdust, glass fibers, asphalts, calcium carbonate, metallic fibers, etc. Construction materials such as roofing, hardboard, insulating board can be fabricated which include the compositions of the invention. The compositions may also be used in pipe, pipe coatings and potting compounds. The compositions can be foamed or used as foam components.

It is to be understood that the foregoing detailed description is given merely by way of illustration and many alterations may be made therein without departing from the spirit of the invention. This applies particularly to the use of modifying materials such as fillers, solvents, plasticizers, ordinary asphalt, tars and other materials in conjunction with the cross-linked asphaltenes of the invention to formulate liquid or solid products. It further applies to the method, conditions and degree of chlorination, to the method, conditions and degree of dechlorination, proportions of ingredients and to the melting point and solubility of the cross-linked asphaltene products. Product variation can also be obtained by changing mold conditions. Sufficient chlorine can be left in the product to confer lowered flammability characteristics.

The other halogens i.e. bromine, iodine and fluorine can be used in place of chlorine in the process of the invention to produce chemically joined products.

We claim:

1. A process for the preparation of modified asphaltenes which comprises the steps of chlorinating a bituminous feed material containing 50–100 weight percent asphaltenes at a temperature in the range of 10° to 150° F. until the chlorinated intermediate material contains 5–30 weight percent chlorine, mixing the chlorinated asphaltenes with 5 to 95 weight percent based on the weight of the total mixture of an organic compound containing available hydrogen and selected from the group consisting of hydrocarbon waxes, chlorinated hydrocarbon waxes, hydrocarbon oils, and resinous polymers derived from ethylenically unsaturated monomers and dechlorinating the mixture at a temperature in the range of 200 to 700° F. in an inert atmosphere until the product contains from 1–10 weight percent chlorine.

2. The composition produced by the process of claim 1.

3. A moldable composition obtained by the process of claim 1 comprising the hydrodechlorination reaction product of chlorinated asphaltenes and from 5 to 40 weight percent based on the weight of the total mixture of a hydrocarbon oil, said oil having a molecular weight of from 100 to 700.

4. A moldable composition obtained by the process of claim 1 comprising the hydrodechlorination reaction product of chlorinated asphaltenes and from 5 to 40 weight percent based on the weight of the total mixture of a paraffin wax, said wax having a melt point of from 100° to 200° F.

5. A modified asphaltene composition obtained by the process of claim 1 comprising the hydrodechlorination reaction product of chlorinated asphaltenes and from 5 to 95 weight percent based on the weight of the total mixture of a thermoplastic resinous polymer derived from ethylenically unsaturated monomers, said polymer having a molecular weight of from 1000 to 500,000.

6. A composition according to claim 5 wherein said polymer is a styrene-butadiene copolymer.

7. A composition according to claim 5 wherein said polymer is polyvinylchloride.

8. A composition according to claim 5 wherein said polymer is polypropylene.

References Cited by the Examiner

UNITED STATES PATENTS

| | | | |
|---|---|---|---|
| 1,979,677 | 11/1934 | Douthett | 196—152 |
| 2,009,712 | 7/1935 | Frolich | 106—23 |
| 2,247,375 | 7/1941 | Hersberger | 196—22 |
| 2,348,832 | 5/1944 | Mauch et al. | 106—273 |
| 2,545,963 | 3/1951 | Mack | 208—44 |
| 2,970,099 | 1/1961 | Illman | 208—44 |
| 3,025,254 | 3/1962 | Cull et al. | 260—28.5 |
| 3,146,118 | 8/1964 | Thorpe | 208—44 |

OTHER REFERENCES

Bitumen, Teere, Asphalte, Peche (Gonnel), vol. 9 (1958), pp. 308–312.

MORRIS LIEBMAN, *Primary Examiner.*

J. W. BEHRINGER, J. E. CALLAGHAN, *Examiners.*